US008711239B2

(12) United States Patent
Nitta

(10) Patent No.: US 8,711,239 B2
(45) Date of Patent: Apr. 29, 2014

(54) PROGRAM RECORDING MEDIUM, IMAGE PROCESSING APPARATUS, IMAGING APPARATUS, AND IMAGE PROCESSING METHOD

(75) Inventor: Keiichi Nitta, Kawasaki (JP)

(73) Assignee: Nikon Corporation, Tokyo (JP)

( * ) Notice: Subject to any disclaimer, the term of this patent is extended or adjusted under 35 U.S.C. 154(b) by 363 days.

(21) Appl. No.: 12/692,196

(22) Filed: Jan. 22, 2010

(65) Prior Publication Data
US 2010/0118152 A1  May 13, 2010

Related U.S. Application Data

(63) Continuation of application No. PCT/JP2008/001482, filed on Jun. 10, 2008.

(30) Foreign Application Priority Data

Jul. 31, 2007  (JP) .................................. 2007-199267

(51) Int. Cl.
H04N 5/225 (2006.01)
H04N 5/228 (2006.01)

(52) U.S. Cl.
USPC ..................................... 348/220.1; 348/222.1

(58) Field of Classification Search
USPC .................. 348/207.99, 220.1, 208.99, 222.1, 348/218.1, 231.5, 207.1
See application file for complete search history.

(56) References Cited

U.S. PATENT DOCUMENTS 4,862,266 A    8/1989  Gillard
5,455,689 A   10/1995  Taylor et al.
5,943,096 A    8/1999  Choo
6,137,947 A * 10/2000  Ohta et al. .................... 386/200
6,151,075 A   11/2000  Shin et al.
6,173,947 B1 * 1/2001  Johnson ......................... 269/17
6,947,082 B2   9/2005  Gomi (Continued)

FOREIGN PATENT DOCUMENTS

EP  0 294 959 A2  12/1988
EP  0 903 946 A1   3/1999

(Continued)

OTHER PUBLICATIONS

Aug. 25, 2011 Summons to Attend Oral Proceedings issued in European Patent Application No. 05020594.7.

(Continued)

Primary Examiner — Ahmed A Berhan
(74) Attorney, Agent, or Firm — Oliff PLC

(57) ABSTRACT

In a first step of a program, data of a plurality of still images generated by continuously imaging still images of a subject using an imaging apparatus is read into a calculating section. In a second step, the calculating section selects a specified image from among an object image group which includes the plurality of still images and in which respective images are continued in a time base direction. In a third step, the calculating section selects a first image to be added from images before the specified image in the time base direction among the object image group. Further, the calculating section determines an addition rate of the first image to be added to the specified image. In a fourth step, the calculating section records data of the addition rate of the first image to be added in association with data of the specified image.

17 Claims, 7 Drawing Sheets

(56) References Cited

U.S. PATENT DOCUMENTS

| | | |
|---|---|---|
| 7,180,548 B2 * | 2/2007 | Mishima et al. .............. 348/441 |
| 7,242,850 B2 | 7/2007 | Cok |
| 7,557,833 B2 | 7/2009 | Okawa |
| 7,764,310 B2 * | 7/2010 | Nitta .......................... 348/220.1 |
| 2002/0135686 A1 | 9/2002 | Kuroiwa |
| 2002/0149696 A1 | 10/2002 | Cok et al. |
| 2003/0161407 A1 | 8/2003 | Murdock et al. |
| 2004/0101058 A1 | 5/2004 | Sasai et al. |
| 2004/0165785 A1 | 8/2004 | Monobe et al. |
| 2006/0061672 A1 | 3/2006 | Nitta |
| 2006/0285019 A1 | 12/2006 | Matschullat |
| 2008/0226197 A1 | 9/2008 | Saga |

FOREIGN PATENT DOCUMENTS

| | | |
|---|---|---|
| EP | 1 237 370 A2 | 9/2002 |
| EP | 1 401 210 A1 | 3/2004 |
| EP | 1 455 536 A1 | 9/2004 |
| GB | 2 264 416 A | 8/1993 |
| JP | A-6-261243 | 9/1994 |
| JP | A-9-116852 | 5/1997 |
| JP | A-10-257435 | 9/1998 |
| JP | A-2000-295568 | 10/2000 |
| JP | A-2001-111934 | 4/2001 |
| JP | A-2002-330335 | 11/2002 |
| JP | A-2002-359778 | 12/2002 |
| JP | A-2003-85591 | 3/2003 |
| JP | A-2003-134512 | 5/2003 |
| JP | A-2003-244659 | 8/2003 |
| JP | A-2004-5344 | 1/2004 |
| JP | A-2006-94058 | 4/2006 |
| JP | A-2007-96724 | 4/2007 |
| WO | WO 01/01698 A1 | 1/2001 |
| WO | WO 2004/004310 A2 | 1/2004 |

OTHER PUBLICATIONS

A. V. Oppenheim, "Signals and Systems," pp. 414-419, Chapter 6, Sec. 6.4, Examples of Discrete-Time Frequency-Selective Filters, Prentice Hall Int. Editions, 1983, USA.
Dec. 1, 2011 Office Action issued in U.S. Appl. No. 12/654,059.
Jun. 21, 2011 Office Action issued in U.S. Appl. No. 12/654,059.
European Office Action dated Aug. 4, 2010 in corresponding European Patent Application No. 05 020 594.7.
Jun. 13, 2008 Office Action issued in U.S. Appl. No. 11/229,747.
Oct. 15, 2008 Office Action issued in U.S. Appl. No. 11/229,747.
Jul. 7, 2009 Office Action issued in U.S. Appl. No. 11/229,747.
Mar. 18, 2010 Notice of Allowance issued in U.S. Appl. No. 11/229,747.
Nov. 12, 2010 Office Action issued in U.S. Appl. No. 12/654,059.
Nov. 15, 2010 Office Action issued in U.S. Appl. No. 12/801,622.
Jan. 17, 2006 Search Report issued in European Patent Application No. 05020594.7.
Oct. 27, 2009 Office Action issued in Japanese Application No. 2004-276063.
U.S. Appl. No. 12/654,059, filed Dec. 9, 2009.
U.S. Appl. No. 12/801,622, filed Jun. 17, 2010.
International Search Report mailed on Aug. 12, 2008 in corresponding International Application No. PCT/JP2008/001482.
International Preliminary Report on Patentability issued on Feb. 24, 2010 in corresponding International Application No. PCT/JP2008/001482.

* cited by examiner

PROGRAM RECORDING MEDIUM, IMAGE PROCESSING APPARATUS, IMAGING APPARATUS, AND IMAGE PROCESSING METHOD

CROSS REFERENCE TO THE RELATED APPLICATIONS

This application is a continuation application of International Application PCT/JP2008/001482, filed Jun. 10, 2008, designating the U.S., and claims the benefit of priority from Japanese Patent Application No. 2007-199267, filed on Jul. 31, 2007, the entire contents of which are incorporated herein by reference.

BACKGROUND

1. Field

The present application relates to an image processing technique to smoothly display a plurality of still images as a motion image.

2. Description of the Related Art

Conventionally, an imaging apparatus capable of shooting a still image while shooting a motion image is publicly known. For example, Japanese Unexamined Patent Application Publication No. 2001-111934 discloses an imaging apparatus that interpolates a missed motion image frame by shooting a still image.

Incidentally, preferred images differ between a still image and a motion image in viewing. For example, in viewing a still image, a vivid image without image deletion is preferred, however, in motion image reproduction, an image with image deletion is preferred because motion is smoother. As a result, it has been comparatively difficult to reproduce both a motion image and a still image in a state preferable for both, and therefore, its improvement is desired.

SUMMARY

A proposition of the present application, therefore, is to provide a unit that makes it possible to reproduce both a motion image and a still image in a state preferable for both.

An aspect of the present embodiment is a program of a computer having a data reading section that reads data of an image and a calculating section. The program causes the calculating section to execute the following first step to fourth step. In the first step, the calculating section reads data of a plurality of still images generated by continuously imaging still images of a subject using an imaging apparatus. In the second step, the calculating section selects a specified image from among an object image group which includes the plurality of still images and in which respective images are continued in a time base direction. In the third step, the calculating section selects a first image to be added from images before the specified image in the time base direction among the object image group in order to generate a composite image by adding the first image to be added before the specified image in a time base direction to the specified image. Further, the calculating section determines an addition rate of the first image to be added to the specified image. In the fourth step, the calculating section records data of the addition rate of the first image to be added in association with data of the specified image.

Another aspect of the present embodiment is a program of a computer having a data reading section that reads data of an image and a calculating section. The program causes the calculating section to execute the following first step to third step. In the first step, the calculating section reads data of an object image group which includes a plurality of specified images and in which the respective images being still images continued in a time base direction, and addition rate data recorded in correspondence with each of the specified images and indicative of an addition rate of images to be added to each of the specified images, in case of generating composite images by adding at least one or more images to be added, which are different in a time base direction, to the specified image. In the second step, the calculating section generates a plurality of composite images by adding the images to be added to each of the specified images using the addition rate data. In the third step, the calculating section reproduces and outputs the plurality of composite images along time series.

Still another aspect of the present embodiment is a program of a computer having a data reading section that reads data of an image, a calculating section, and a memory section. The program causes the calculating section to execute the following first step to fourth step. In the first step, the calculating section reads data of a plurality of still images generated by continuously imaging still images of a subject using an imaging apparatus. In the second step, the calculating section selects specified images from among an object image group which includes the plurality of still images and in which respective images are continued in a time base direction. In the third step, the calculating section generates composite images by adding at least one or more images to be added, which are different in a time base direction, to the specified images based on addition rate data recorded in correspondence with the specific images and indicative of an addition rate of the images to be added to the specified images. Further, the calculating section generates data of a motion image from a plurality of composite images. In the fourth step, the calculating section records data of each of the specified images along with the data of the motion image in the memory section.

Still another aspect of the present embodiment is a program of a computer having a data reading section that reads data of an image, a calculating section, and an operation section. The program causes the calculating section to execute the following first step to second step. In the first step, the calculating section reads respective data of a plurality of specified images being still images continued in a time base direction, and data of a motion image. The data of the above-mentioned motion image includes a plurality of composite images generated by adding an image, which is different in a time base direction, to the specified images based on addition rate data recorded in correspondence with the specific images and indicative of an addition rate of the image, which is different in the time base direction, to the specified images. In the second step, the calculating section selectively executes a first reproduction mode which reproduces and outputs the specified images along time series and a second reproduction mode which reproduces and outputs the motion image.

What is converted and represented from the configuration according to the above-mentioned embodiment into an image processing apparatus that executes the above-mentioned programs, an imaging apparatus including the image processing apparatus, an image processing method, a recording medium storing the above-mentioned programs, etc., is also included in the specific aspects of the present application.

BRIEF DESCRIPTION OF THE DRAWINGS

FIG. 8B is a diagram schematically showing a composite image in which FIG. 8A is a core of display.

DETAILED DESCRIPTION OF THE EMBODIMENTS

<Explanation of First Embodiment>

Figure 1:
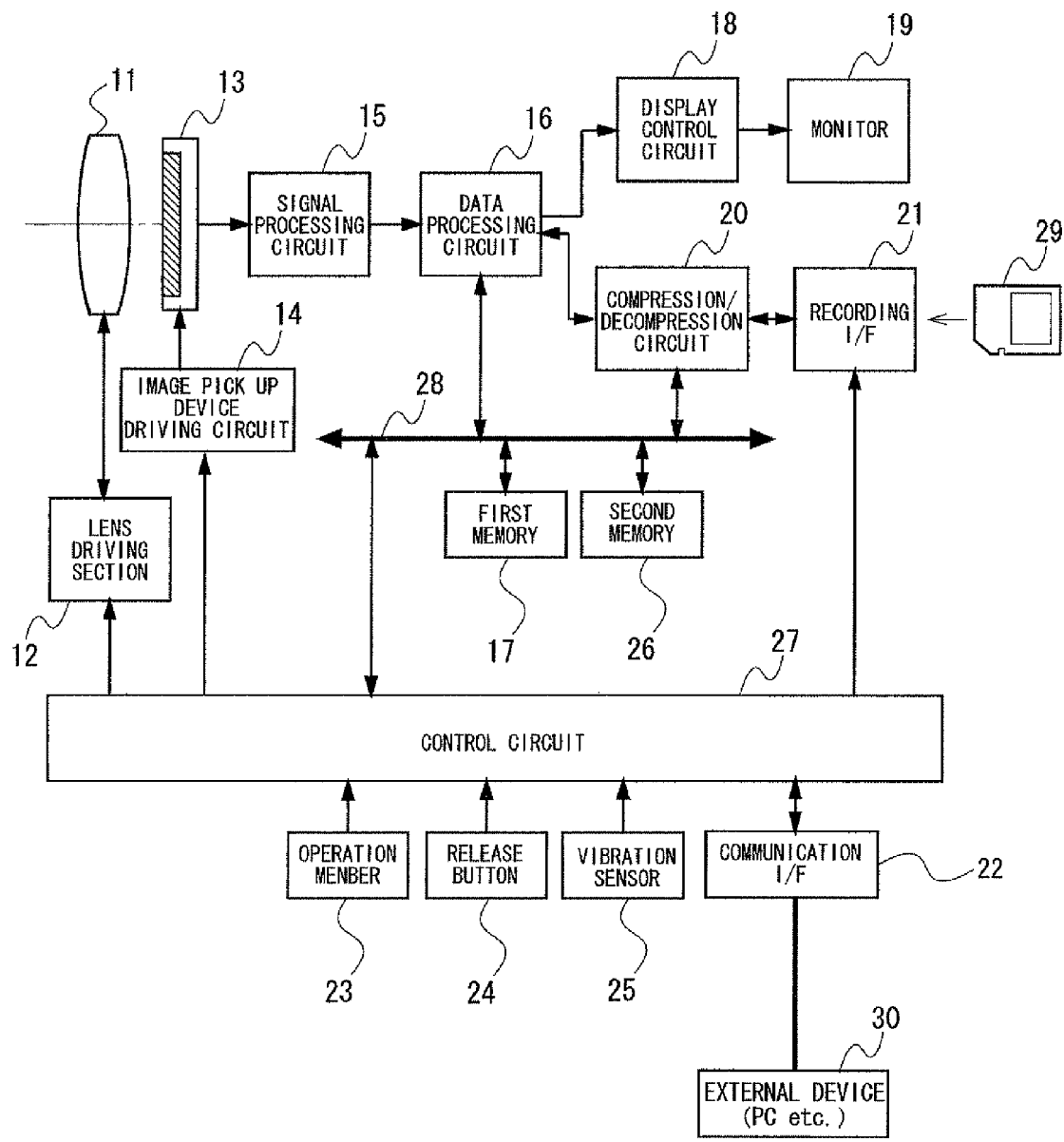
FIG. 1 is a block diagram showing a configuration of an electronic camera in a first embodiment.

FIG. 1 is a block diagram showing a configuration of an electronic camera in a first embodiment. The electronic camera includes an imaging optical system 11, a lens driving section 12, an image pickup device 13, an image pickup device driving circuit 14, a signal processing circuit 15, a data processing circuit 16, a first memory 17, a display control circuit 18, a monitor 19, a compression/decompression circuit 20, a recording I/F (interface) 21, a communication I/F (interface) 22, an operation member 23, a release button 24, a vibration sensor 25, a second memory 26, a control circuit 27, and a bus 28.

Here, the data processing circuit 16, the first memory 17, the compression/decompression circuit 20, the second memory 26, and the control circuit 27 are coupled mutually via the bus 28, respectively. The lens driving section 12, the image pickup device driving circuit 14, the signal processing circuit 15, the display control circuit 18, the recording I/F 21, the communication I/F 22, the operation member 23, the release button 24, and the vibration sensor 25 are coupled with the control circuit 27, respectively (in FIG. 1, signal lines that couple the signal processing circuit 15, the display control circuit 18, and the control circuit 27 with each another are not shown schematically for the sake of simplicity).

The imaging optical system 11 includes a plurality of lens groups including a zoom lens and focusing lens and plays a role to form an image of a subject on the imaging plane of the image pickup device 13. For the sake of simplicity, in FIG. 1, the imaging optical system 11 is shown schematically as a single lens.

Each lens position of the imaging optical system 11 is adjusted in the optical axis direction by the lens driving section 12. The lens driving section 12 includes a lens driving mechanism and adjusts the lens position in accordance with a lens drive instruction from the control circuit 27. For example, by the lens driving section 12 driving the focus lens back and forth in the optical axis direction, the focus adjustment of the imaging optical system 11 is made. Further, by the lens driving section 12 driving the zoom lens back and forth in the optical axis direction, the zoom adjustment of the imaging optical system 11 is made.

The image pickup device 13 photoelectrically converts a subject image formed by light flux having passed through the imaging optical system 11 and generates an analog image signal. The image pickup device 13 in the present embodiment is capable of imaging a single still image, continuously imaging still images, and imaging a motion image. The output of the image pickup device 13 is coupled to the signal processing circuit 15. The image pickup device 13 includes a CCD image sensor or a CMOS type image sensor.

The image pickup device driving circuit 14 generates a drive signal at a predetermined timing in response to an instruction from the control circuit 27 and supplies the drive signal to the image pickup device 13. Then, the image pickup device driving circuit 14 controls charge accumulation (imaging) and accumulated charge reading of the image pickup device 13 by the above-mentioned drive signal.

The signal processing circuit 15 is an ASIC that performs various kinds of signal processing on the output of the image pickup device 13. Specifically, the signal processing circuit 15 performs correlation double sampling, gain adjustment, direct current reproduction, A/D conversion, etc. Parameters of gain adjustment etc. in the signal processing circuit 15 are determined in accordance with an instruction from the control circuit 27. The signal processing circuit 15 is coupled to the data processing circuit 16 and the data after the above-mentioned signal processing is output to the data processing circuit 16.

The data processing circuit 16 is a circuit that performs digital signal processing on the data of an image output from the signal processing circuit 15. In the data processing circuit 16, image processing, such as color interpolation processing, gradation conversion processing, contour enhancement processing, and white balance adjustment, is performed. The data processing circuit 16 is coupled to the display control circuit 18 and compression/decompression circuit 20, respectively. Then, the data processing circuit 16 outputs the data of a recording image after image processing to the compression/decompression circuit 20 in response to an instruction from the control circuit 27.

Further, the data processing circuit 16 performs resolution conversion (pixel number conversion) processing of an image in response to an instruction from the control circuit 27. As an example, when displaying a reproduction image on the monitor 19, the data processing circuit 16 performs resolution conversion (pixel number conversion) processing on the data of the image to be reproduced and displayed in order to match the data with the number of pixels of the monitor 19 (except when specified otherwise, when an image is displayed on the monitor 19 in the present specification, it is assumed that the adjustment of the number of pixels of the image to be displayed has already been made in the data processing circuit 16). Then, the data processing circuit 16 outputs the data of the reproduction image after the resolution conversion to the display control circuit 18. When performing electronic zoom processing, the data processing circuit 16 performs resolution conversion (pixel number conversion) processing on the data of the image to be input and outputs the image data after the resolution conversion to the compression/decompression circuit 20 and the display control circuit 18, respectively.

The first memory 17 is a buffer memory that temporarily stores image data in a process before or after the processing by the data processing circuit 16 or the compression/decompression circuit 20.

The display control circuit 18 performs predetermined signal processing (for example, conversion of gradation characteristics in accordance with the display characteristics of the monitor 19) on the image data input from the data processing circuit 16 in response to an instruction from the control circuit 27 and outputs the data to the monitor 19. The display control circuit 18 performs processing to further superimpose overlay image data of, such as a shooting menu and cursor, on the above-mentioned image data. By such control by the control circuit 27 and the display control circuit 18, it is possible to display a subject image superimposed with the overlay image on the monitor 19. The monitor 19 in the present embodiment may include either an electronic finder having an ocular part or a liquid crystal display panel to be provided on the backside of a camera housing etc.

The compression/decompression circuit 20 performs predetermined compression processing on the image data input from the data processing circuit 16 in response to an instruction from the control circuit 27. The compression/decompression circuit 20 is coupled to the recording I/F 21 and the image data after the compression is output to the recording I/F 21. Further, the compression/decompression circuit 20 performs decoding processing, which is processing inverse to compression processing, on the image data after the compression. Incidentally, the compression/decompression circuit 20 in the present embodiment has a configuration capable of performing reversible compression (so-called loss-less encoding).

In the recording I/F 21, a connector for coupling a memory medium 29 is formed. Then, the recording I/F 21 performs data write/read to/from the memory medium 29 coupled to the connector. The above-mentioned memory medium 29 includes a compact hard disk, memory card that incorporates a semiconductor memory, and optical disk, such as DVD, etc. FIG. 1 schematically shows a memory card as an example of the memory medium 29. The memory medium 29 may be one which is incorporated in an electronic camera, or may be mounted to an electronic camera in an attachable/detachable manner. As a memory medium that reads and writes image data, it may also be possible to utilize an external memory medium electrically coupled thereto via the communication I/F 22.

Here, when recording data of an image imaged in a shooting mode, which is one of the operation modes of an electronic camera, the control circuit 27 displays a reproduction image corresponding to a recording image on the monitor 19. It is assumed that a recording image in the present specification means a still image obtained by imaging and corresponding to still image data to be finally recorded in the memory medium 29 (or already recorded in the memory medium 29).

When non-compression recording of a recording image is instructed to the control circuit 27 by the operation of a user using the operation member 23, the compression/decompression circuit 20 does not perform compression processing and outputs the data of the recording image to the recording I/F 21. In the above-mentioned non-compression recording also, the control circuit 27 displays a reproduction image corresponding to the recording image on the monitor 19.

In the reproduction mode, which is one of the operation modes of the electronic camera, the control circuit 27 displays the reproduction image by the image data stored in the memory medium 29 on the monitor 19. In the reproduction mode, the recording I/F 21 reads image data to be reproduced from the memory medium 29 in response to an instruction from the control circuit 27. Then, after performing decoding processing on the image data to be reproduced, the compression/decompression circuit 20 sends the image data after the decoding to the data processing circuit 16. Then, the data processing circuit 16 and display control circuit 18 perform the above-described processing on the image data after the decoding, and thereby, the reproduction image is displayed on the monitor 19. When non-compressed image data is read from the memory medium 29, the compression/decompression circuit 20 sends the image data to the data processing circuit 16 without performing decoding processing.

The communication I/F 22 controls data transmission/reception with an external device 30 (for example, a personal computer or an external memory medium) in conformance to the specifications of the publicly-known wired or wireless communication standards. The communication between the electronic camera and the external device 30 is established via a wired or wireless communication line.

The operation member 23 includes, for example, a command dial, cross-shaped cursor key, zoom operation button, determination button, etc. Then, the operation member 23 receives various inputs of the electronic camera from a user. It may also be possible to provide a setting member to set a number of frames used to generate an interpolation image, to be described later, to the operation member 23.

As an example, when receiving an input from the zoom operation button, the control circuit 27 outputs a lens drive instruction for the zoom lens and causes the lens driving section 12 to drive the zoom lens back and forth. Consequently, a subject image formed on the imaging plane of the image pickup device 13 is enlarged or reduced and thus, an optical zoom adjustment by the imaging optical system 11 is made.

Further, when receiving an input from the zoom operation button, the control circuit 27 outputs an instruction to the data processing circuit 16 and varies the conversion rate of the resolution conversion processing for the image data in accordance with the operation of a user. Consequently, the image to be displayed on the monitor 19 is enlarged or reduced and an electronic zoom adjustment is made (electronic zoom). The conversion rate of the above-mentioned resolution conversion processing corresponds to an electronic zoom magnification. When the data processing circuit 16 varies the conversion rate to increase the electronic zoom magnification, part of the reproduction image is displayed enlarged on the monitor 19 (as the enlargement ratio increases, the display range of the reproduction image reduces). On the other hand, when the data processing circuit 16 varies the conversion rate to decrease the electronic zoom magnification, the enlargement ratio of the reproduction image to be displayed on the monitor 19 reduces, however, the display range of the reproduction image is enlarged. In the above-mentioned shooting mode, it is possible to record the data of an imaged image corresponding to the display image on the monitor 19 in the memory medium 29.

In the shooting mode, the release button 24 receives an input to instruct the start of auto focus (AF) operation before shooting by half-pressing operation and an input to instruct the start of imaging operation by fully-pressing operation.

The control circuit 27 performs the AF operation by the publicly-known contrast detection method in response to the half-pressing operation of the release button 24. In the AF operation, a signal corresponding to a focus detection region set in advance in the shooting screen is used among image signals read from the image pickup device 13. Specifically, the control circuit 27 sends a lens drive instruction of the focus lens to the lens driving section 12 so that the integrated value of high frequency components (so-called focal point evaluation value) about the data corresponding to the focus detection region is maximized among image data signal-processed by the signal processing circuit 15. The position of the focus lens where the focal point evaluation value is maximized is an in-focus position where the blurring at the edge of a subject image imaged by the image pickup device 13 is eliminated and the contrast of the image is maximized (the acutance is enhanced).

The vibration sensor 25 detects vibrations of the housing of the electronic camera in two directions perpendicular to each other. The vibration sensor 25 includes, for example, an angle speed sensor, a gyro sensor, etc., and is located in the housing of the electronic camera. The vibration sensor 25 detects vibrations applied to the electronic camera in the shooting mode and outputs data of vibration amount in the two perpendicular directions to the control circuit 27. The control circuit 27 performs camera shake compensation based on the above-mentioned data of vibration amount. For example, when the imaging optical system 11 includes a camera shake compensation lens, the control circuit 27 performs camera shake compensation by driving the camera shake compensation lens via the lens driving section 12 so that the movement of a subject accompanying the vibrations of the housing is canceled on the imaging plane.

The second memory 26 is a nonvolatile memory medium, such as a flash memory. The second memory 26 stores various pieces of setting data.

The control circuit 27 is a processor that totally controls the operation of the electronic camera. For example, the control circuit 27 finds the brightness of the field from a signal output from the image pickup device 13. Then, the control circuit 27 performs the publicly-known AE operation based on the above-mentioned brightness information and determines imaging conditions in the shooting mode (charge accumulation time of the image pickup device 13, the aperture value of the aperture (not shown schematically), degree of amplification of an image signal).

Further, the control circuit 27 performs processing to generate an interpolation image, composition processing by image addition in the time direction, etc., by executing a program stored in the second memory 26 etc. (the processing is described later).

Hereinafter, the operation in the continuous shooting mode and the operation in the reproduction mode of the electronic camera in the first embodiment are explained, respectively.

(Explanation of Continuous Shooting Mode)

Figure 2:
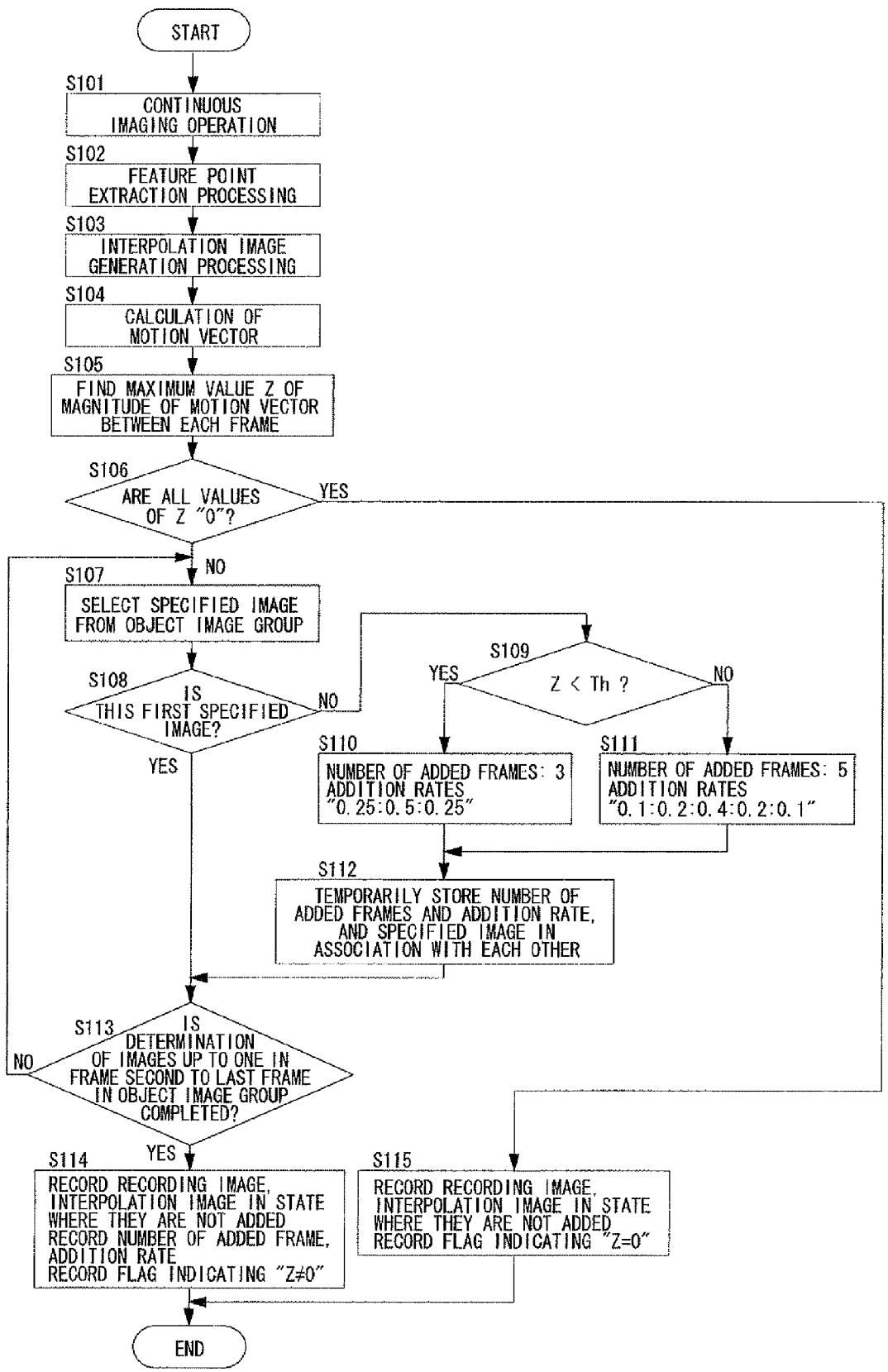
FIG. 2 is a flowchart showing operations in a continuous shooting mode in the first embodiment.

FIG. 2 is a flowchart showing the operation in the continuous shooting mode in the first embodiment. Here, the continuous shooting mode is one of the shooting modes described above, and in which the electronic camera continuously performs the imaging operation of still images at predetermined time intervals while the release button 24 is being pressed. In the continuous shooting mode, the control circuit 27 determines the imaging conditions so that each of the recording images continuously shot is worth viewing. For example, the control circuit 27 reduces the aperture to increase the depth of field.

Step S101: When detecting the pressing operation of the release button 24, the control circuit 27 continuously performs the above-mentioned AF operation and at the same time, performs the continuous shooting operation of recording images.

Here, it may also be possible for the control circuit 27 to perform the AF operation in step S101 by tracking a specified subject that moves in the screen. Alternatively, it may also be possible for the control circuit 27 to perform the AF operation so that an object at a predetermined shooting distance is always in focus. In S101, it may also be possible for the control circuit 27 to make a focus adjustment by the manual operation of a user via the operation member 23.

Further, as to the continuous shooting operation in S101, the control circuit 27 instructs the image pickup device driving circuit 14 to output a drive signal to perform the continuous shooting operation. Upon receipt of the above-mentioned drive signal, the image pickup device 13 outputs an image signal at a frame rate of, for example, 10 fps. Then, the image signal of each frame output from the image pickup device 13 is subjected to predetermined processing in the signal processing circuit 15 and the data processing circuit 16. After that, the control circuit 27 causes the first memory 17 to temporarily store the data of the recording image corresponding to each frame.

At the time of the continuous shooting operation, the data processing circuit 16 performs resolution conversion processing on the data of the recording image and generates data of a view image in accordance with the number of pixels of the monitor 19. Then, the data processing circuit 16 sequentially supplies the view image data of each frame to the monitor 19 via the display control circuit 18. At the time of the continuous shooting operation, by the control of the display control circuit 18, the view image corresponding to each frame is displayed sequentially on the monitor 19. Consequently, it is possible for a user to confirm the state of the field and the composition of the recording image by visually inspecting the view image on the monitor 19.

Step S102: The control circuit 27 performs feature point extraction processing on the data of each recording image (S101) stored in the first memory 17. Specifically, the control circuit 27 extracts edge components of the data of the recording image and finds, for example, the position of the intersection (corner) of the extracted edges as a feature point. Then, the control circuit 27 records the position of the feature point corresponding to the frame of each recording image in the first memory 17 or the second memory 26. The control circuit 27 may extract a point specified by a user on the monitor 19 as a feature point.

Step S103: The control circuit 27 generates an interpolation image that interpolates frames of a plurality of recording images. The number of pixels of the interpolation image is set to the same number of pixels of the recording image. Further, the control circuit 27 in the present embodiment generates an interpolation image by performing a geometric morphing process accompanied by deformation of the subject image or a morphing process in which the subject image does not deform but moves.

Specifically, the control circuit 27 generates an interpolation image by the procedure shown by (a) to (g) below. Here, the number of frames of the interpolation image to be inserted between two recording images is varied by the control circuit 27 in accordance with the input by a user. In the following example, for the sake of simplicity, a case is explained, where interpolation images corresponding to two frames are inserted between the two recording images.

(a) The control circuit 27 specifies the frames of two recording images adjacent to each other in the time base direction as key frames.

(b) The control circuit 27 associates the feature points included respectively in the two key frames specified in (a) described above with each another. For example, the control circuit 27 performs matching processing of feature points between the two key frames and finds a correspondence relationship between respective feature points.

(c) The control circuit 27 finds a function that couples the positions of the pair of feature points associated with each other in (b) described above in the spatial direction (locus of the movement of the feature points in the morphing operation). Here, the above-mentioned function may be one that couples the pair of feature points by a straight line, or one that couples the pair of feature points by a spline curve. The control circuit 27 finds the above-mentioned function for all of the feature points that can be associated between the two key frames.

(d) The control circuit 27 determines the position of the feature point in the frame of the interpolation image by the function obtained by (c) described above. Specifically, the control circuit 27 internally divides the section defined by the above-mentioned function and the pair of feature points in accordance with the number of inserted interpolation images and specifies the internally divided position as the position of the feature point of the interpolation frame.

Figure 3:
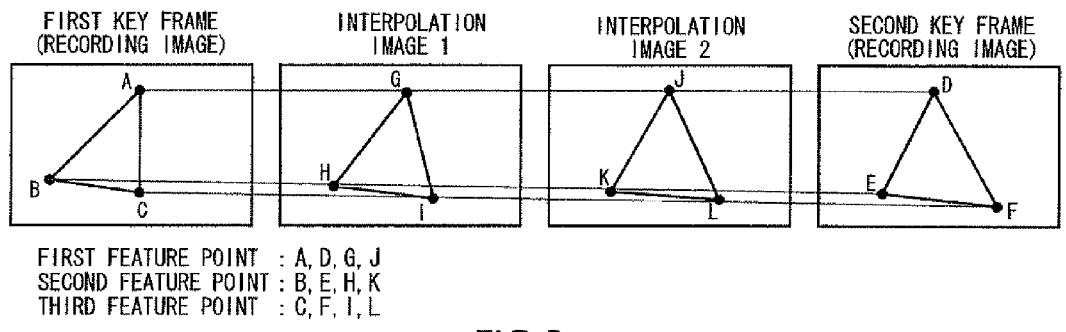
FIG. 3 is an explanatory diagram showing an example of a method of determining a feature point in an interpolation image.

FIG. 3 is an explanatory diagram showing an example of a method of determining a feature point in an interpolation image. In the example in FIG. 3, to feature points A, B, C in the first key frame, feature points D, E, F in the second key frame correspond, respectively. Then, the positions of points (G, J) that internally divide the section into three of the linear function that couples the first feature points A, D are the positions of the first feature points in the respective interpolation images. It is also possible to find the positions of the second feature points (H, K) and the positions of the third feature points (I, L) in the interpolation images by the same procedure as that for the above-mentioned first feature points.

(e) The control circuit 27 respectively finds the position of a target pixel other than the feature points in the interpolation image. Specifically, the control circuit 27 defines the position of a target pixel in the key frame by vectors that couple the feature points. Then, the control circuit 27 finds the position of the target pixel on the interpolation image based on the definition of the above-mentioned vector.

Figure 4:
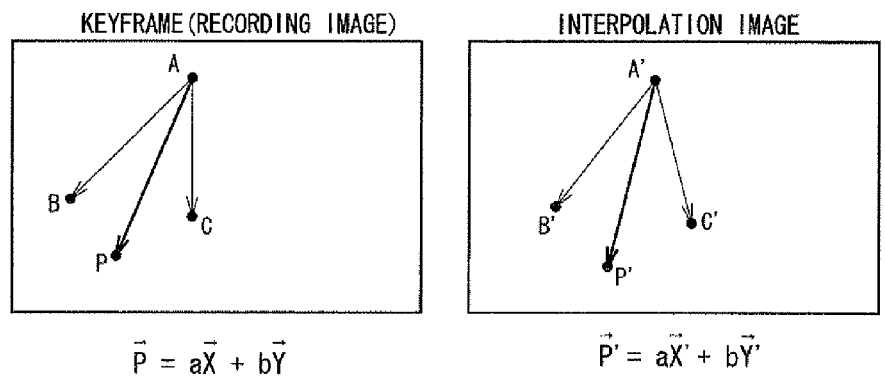
FIG. 4 is an explanatory diagram showing an example of a method of determining a target pixel in an interpolation image.

FIG. 4 is an explanatory diagram showing an example of a method of determining a target pixel in an interpolation image.

In the key frame that includes the feature points A, B, C and a target pixel P, a vector $\vec{P}$ that couples the feature point A and the target pixel P can be defined as the following expression (1) of the relationship between a vector $\vec{X}$ that couples the feature points A, B and a vector $\vec{Y}$ that couples the feature points A, C.

$$\vec{P}=a\vec{X}+b\vec{Y} \quad (1)$$

Here, in the expression (1), a, b are coefficients.

On the other hand, in the interpolation image, when the positions of feature points A', B', C' having a correspondence relationship with the feature points A, B, C are already known, it is possible to find the position of a target pixel P' corresponding to the target pixel P in the interpolation image as follows. That is, it is possible to obtain a vector $\vec{P}'$ that couples the feature point A' and the target pixel P' by the following expression (2) of the relationship between a vector $\vec{X}'$ that couples the feature points A', B' and a vector $\vec{Y}'$ that couples the feature points A', C'.

$$\vec{P}'=a\vec{X}'+b\vec{Y}' \quad (2)$$

Consequently, it is possible for the control circuit 27 to find the position of each target pixel in the interpolation image by the above-mentioned method.

(f) The control circuit 27 finds the change in gradation value of each pixel in the interpolation image. Specifically, firstly, the control circuit 27 respectively finds the gradation values of the pixels (target pixels) having a correspondence relationship between the two key frames. Secondly, the control circuit 27 internally divides the section of the two gradation values in accordance with the number of inserted interpolation images and finds the gradation value of the target pixel in the interpolation image. As an example, when the gradation values of the target pixels in the two key frames are 130, 136, respectively, the control circuit 27 finds points that internally divide the section of the gradation values 130 to 136 into three sections. Then, the control circuit 27 specifies the gradation values (132, 134) corresponding to the above-mentioned internally divided points as gradation values of the target pixel in the respective interpolation images. The control circuit 27 finds the above-mentioned gradation values for the values of RGB or YCbCr, respectively.

(g) The control circuit 27 records the interpolation image generated in the above-mentioned processes in the first memory 17 or the second memory 26. Then, the control circuit 27 changes the key frames specified in (a) described above and repeats the processes from (b) to (g) described above. Consequently, the control circuit 27 generates interpolation images between all of the frames of the recording images continuously shot, respectively.

Step S104: The control circuit 27 obtains a motion vector of a subject between frames with the frames of two recording images neighboring in the time base direction as an object. For example, the control circuit 27 extracts a motion of the subject between frames in units of macro blocks of 16×16 pixels and obtains a motion vector of the subject between frames from this result. In S104, the control circuit 27 calculates the above-mentioned motion vectors respectively between all of the frames of the recording images continuously shot.

Step S105: The control circuit 27 finds a maximum value Z of the magnitude of a motion vector among the motion vectors (found in S104) between frames of each recording image. Then, the control circuit 27 records the maximum value Z of the magnitude of the motion vector in the first memory 17.

Step S106: The control circuit 27 determines whether or not the maximum values Z of the magnitude of the motion vector (found in S105) are each "0" value between all of the frames. When the above-mentioned requirement is met (YES side), the procedure moves to S115. On the other hand, when the above-mentioned requirement is not met (NO side), the procedure moves to S107. The situation when the determination result is on the YES side in S106 corresponds to a situation when a subject the brightness and color of which change but which is motionless is shot continuously etc.

Step S107: The control circuit 27 selects one specified image from among the object image group including frames of recording images and frames of interpolation images. The specified image is an image used as the standard when a composite image, to be described later, is generated. Most preferably, the specified image is selected from among the object image group so that the time intervals of the recording images and those of the interpolation images are equal when they are arranged in time series.

In S107 in the present embodiment, it is assumed that the control circuit 27 sequentially selects a specified image from among the frames of the recording images. In this selection, all of the specified images are selected from a plurality of recording images arranged in time series with none of mid-images being skipped.

Step S108: The control circuit 27 determines whether or not the current specified image selected in S107 is the first specified image (the first recording image by continuous shooting). When it is the first specified image (YES side), the procedure moves to S113. On the other hand, when it is not the first specified image (NO side), the procedure moves to S109.

Step S109: The control circuit 27 respectively reads values corresponding to those between the current specified image and the next specified image from the maximum values Z of the magnitude of the motion vector found in S105. Then, the control circuit 27 determines whether or not the maximum value Z of the magnitude of the motion vector that is read is less than a threshold value Th (Z<Th). When the above-mentioned requirement is met (YES side), the procedure moves to S110. On the other hand, when the above-mentioned requirement is not met (NO side), the procedure moves to S111.

Step S110: The control circuit 27 sets the number of frames to be added when a composite image used in motion image reproduction is generated to "3" and at the same time, determines the addition rates of the specified image and the interpolation image, respectively. A composite image is an image generated by adding an image different in the time base direction to a specified image to create the image deletion in the subject.

Figure 5A:
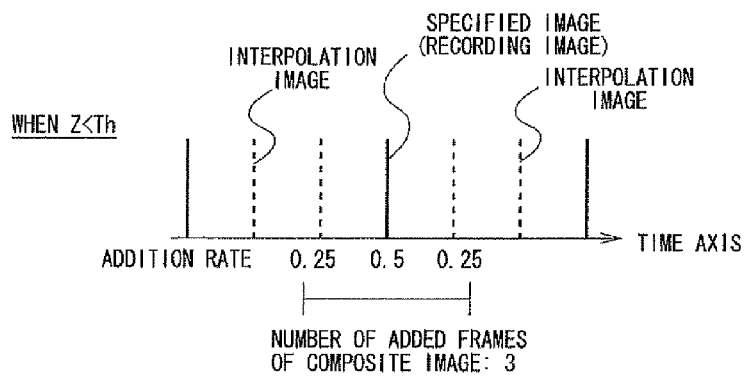
FIGS. 5A and 5B are diagrams showing images constituting a composite image and an addition rate.

Specifically, the control circuit 27 selects interpolation images for one frame each before (past) and after (future) the specified image in the time base direction (that is, a past interpolation image corresponding to one frame and a future interpolation image corresponding to one frame based on the specified image as a standard), respectively, as an image to be added. Then, the control circuit 27 sets the addition rate of the specified image to 0.5. Further, the control circuit 27 sets the addition rate of each of the images to be added to 0.25, respectively. That is, the addition rates of the images in S110 are "0.25:0.5:0.25" when expressed in the time base direction (refer to FIG. 5A). After that, the control circuit 27 moves the procedure to the processing in S112.

Step S111: The control circuit 27 sets the number of frames to be added when a composite image used in motion image reproduction is generated to "5" and at the same time, determines the addition rates of the specified image and the interpolation image, respectively.

Specifically, the control circuit 27 selects interpolation images corresponding to two frames, respectively, before and after the specified image in the time base direction (that is, past interpolation images corresponding to up to two frames and future interpolation images corresponding to up to two frames based on the specified image as a standard), respectively, as an image to be added. Then, the control circuit 27 sets the addition rate of the specified image to 0.4. Further, the control circuit 27 sets the addition rate of the interpolation image corresponding to the first frame before and after the specified image, as a standard, of the respective images to be added to 0.2, respectively. Furthermore, the control circuit 27 sets the addition rate of the interpolation image corresponding to the second frame before and after the specified image, as a standard, of the respective images to be added to 0.1, respectively. That is, the addition rates of the images in S111 are "0.1:0.2:0.4:0.2:0.1" when expressed in the time base direction (refer to FIG. 5B).

Step S112: The control circuit 27 temporarily stores the above-mentioned number of added frames and the addition rate (found in S110 or S111) in association with the data of the specified image (S107) in the first memory 17.

Step S113: The control circuit 27 determines whether or not determination has been completed up to the frame second to the last frame in the object image group including the frames of the recording images and the frames of the interpolation images. In the present embodiment, whether or not determination has been completed up to the frame second to the last frame of the recording image is determined. When the above-mentioned requirement is met (YES side), the procedure moves to S114. On the other hand, when the above-mentioned requirement is not met (NO side), the control circuit 27 returns the procedure to S107 and repeats the above-mentioned operations.

Step S114: The compression/decompression circuit 20 generates an image file by performing the Motion-JPEG compression in the state where the data of the recording image and the data of the interpolation image are not added (in the state where no composite image is generated) in response to an instruction of the control circuit 27. By the Motion-JPEG compression, the recording capacity of the entire image data can be reduced. Then, the control circuit 27 records the number of added frames and the data of the addition rate in relation to each specified image in association within the image file. Further, the control circuit 27 records a flag to the effect that the magnitude of the motion vector is not "0" in the image file. Then, the image file is finally recorded in the memory medium 29. After that, the control circuit 27 ends the processing in the continuous shooting mode.

As a result, when reproducing the image file in S114 as a motion image, the control circuit 27 can easily generate a composite image suitable for motion image reproduction by referring to the number of added frames and the data of addition rate.

Step S115: The compression/decompression circuit 20 generates an image file by performing the Motion-JPEG compression in a state where the data of recording image and the data of interpolation image are not added (in a state where no composite image is generated) in response to an instruction of the control circuit 27. In S115, the control circuit 27 records a flag to the effect that the magnitude of the motion vector is "0" in the image file. Then, the image file is finally recorded in the memory medium 29. The explanation of the flowchart in FIG. 2 is completed as above.

(Explanation of Reproduction Mode)

Figure 6:
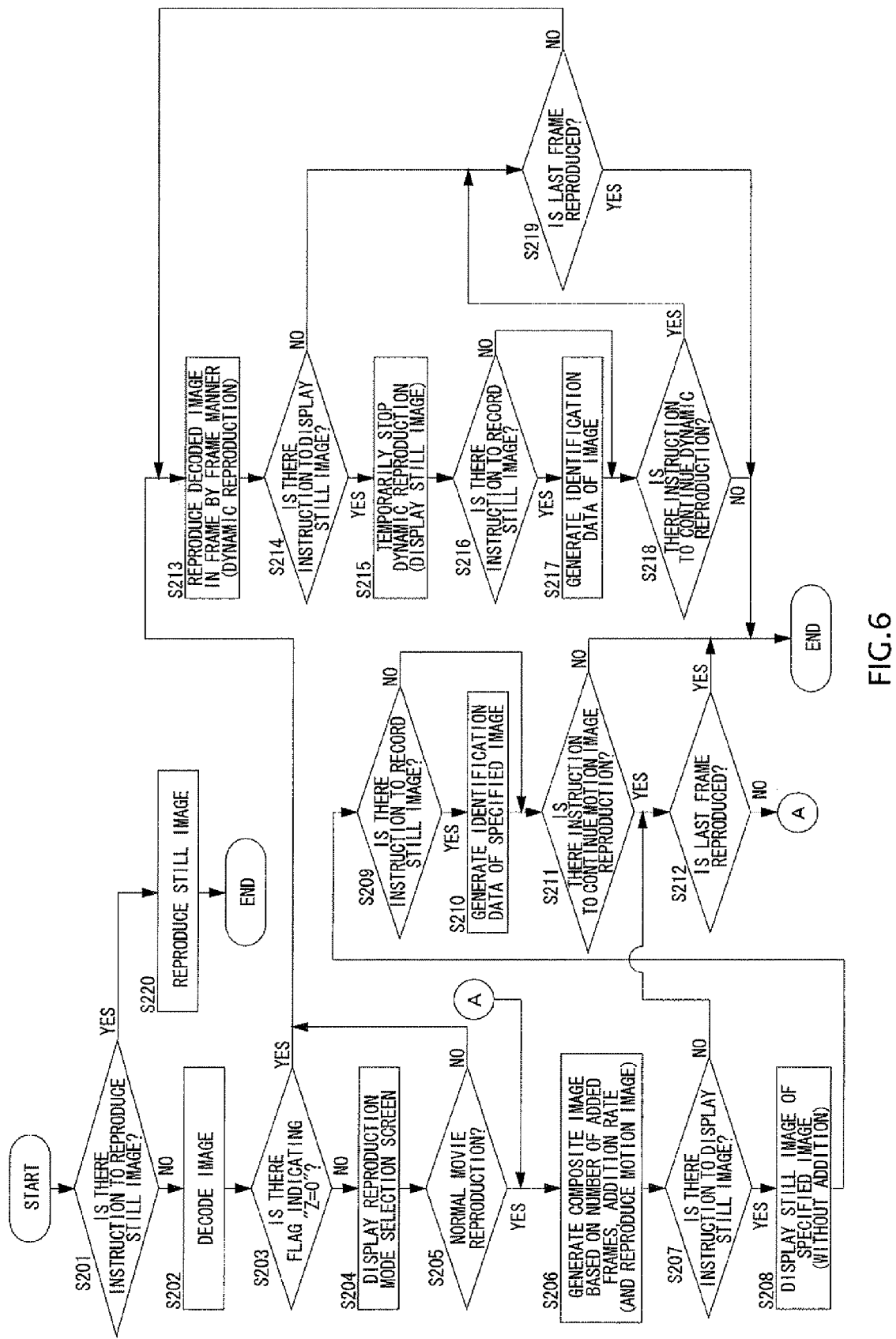
FIG. 6 is a flowchart showing operations in a reproduction mode in the first embodiment.

FIG. 6 is a flowchart showing operations in the reproduction mode in the first embodiment. The reproduction mode is explained on the assumption that the image file (generated in S114, S115) in the above-mentioned continuous shooting mode is an object of reproduction. The processing of the flowchart is started when a user issues an image reproduction instruction by operating the operation member 23. That is, the processing of the flowchart is started when a user specifies "still image reproduction" or "motion image reproduction" shown in FIG. 7.

Step S201: The control circuit 27 determines whether or not still image reproduction of an image file is instructed. When still image reproduction is instructed (YES side), the procedure moves to S220. On the other hand, when still image reproduction is not instructed (NO side), the procedure moves to S202.

Step S202: The control circuit 27 reads an image file to be reproduced from the memory medium 29. Then, the compression/decompression circuit 20 performs decoding processing on the image data in the image file in response to an instruction of the control circuit 27. The data of each decoded image is stored temporarily in the first memory 17.

Step S203: The control circuit 27 determines whether or not a flag to the effect that the magnitude of the motion vector is "0" is recorded in the image file to be reproduced. When the above-mentioned requirement is met (YES side), the procedure moves to S213. The situation when the determination result is on the YES side in S203 corresponds to a situation when the object of reproduction is the image file in S115. On the other hand, when the above-mentioned requirement is not met (NO side), the procedure moves to S204. The situation when the determination result is on the NO side in S203 corresponds to a situation when the object of reproduction is the image file in S114.

Step S204: The control circuit 27 displays a screen (refer to FIG. 7) on the monitor 19, which screen prompts a user to select a reproduction mode of the image file between "normal movie reproduction" and "frame by frame reproduction (dynamic reproduction)". Then, the control circuit 27 waits for an input to select a reproduction mode from a user via the operation member 23. Upon receipt of the above-mentioned input to select a reproduction mode from the operation member 23, the control circuit 27 moves the procedure to S205.

Step S205: The control circuit 27 determines whether or not the input to select "normal movie reproduction" as a reproduction mode is made. When "normal movie reproduction" is selected (YES side), the procedure moves to S206. On the other hand, when "frame by frame reproduction" is selected (NO side), the procedure moves to S213.

Step S206: The control circuit 27 acquires the number of added frames and the data of addition rate in relation to each specified image from the image file to be reproduced. Then, the control circuit 27 generates a composite image by adding the specified image and the interpolation image based on the above-mentioned number of added frames and the addition rate. Then, the control circuit 27 reproduces the specified image of the first frame, the above-mentioned composite image, and the specified image of the last frame on the monitor 19 as a motion image along time series via the data processing circuit 16 and the display control circuit 18. Thus, the motion image reproduction on the monitor 19 is started.

Figure 8A:
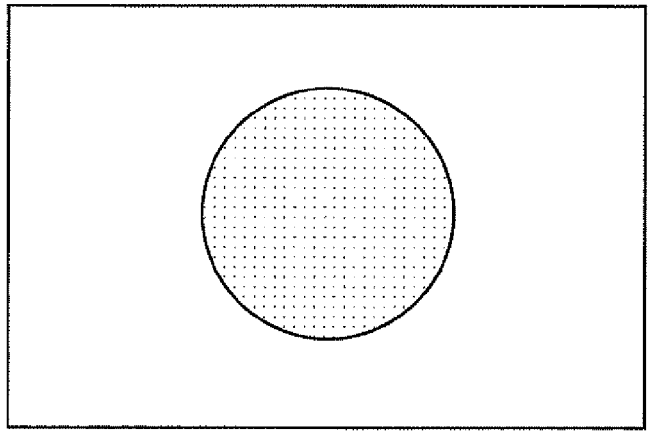
FIG. 8A is a diagram showing an example of a specified image.
Figure 8B:
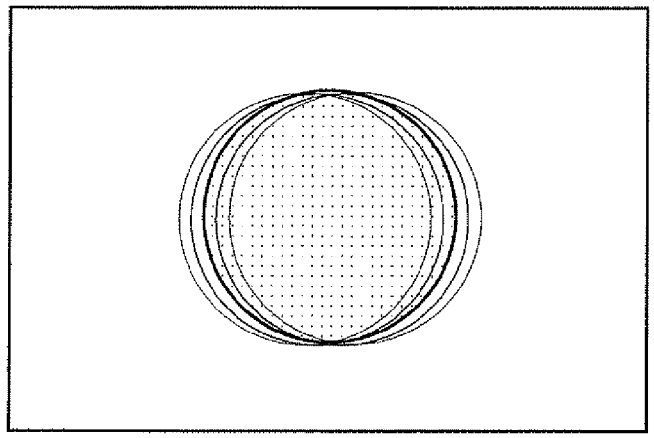

FIG. 8A shows an example of a specified image. FIG. 8B schematically shows composite images having the specified image in FIG. 8A as a core of display. In the example in FIG. 8B, the number of added frames is "5" and the addition rates of the images are "0.1:0.2:0.4:0.2:0.1" when expressed in the time base direction. In the composite image, past images and future images in the time base direction are added to the specified image, which is a core of display, and therefore, the image deletion occurs on the screen. As a result, when a plurality of composite images is viewed as a motion image, the image is preferable because the motion is smooth. The number of added frames and the addition rate when a composite image is generated are varied by the control circuit 27 in accordance with the magnitude of the motion frame between the recording images continuously shot. As a result, in the present embodiment, it is possible to adjust the amount of image deletion of composite images to a preferable amount in accordance with the motion of the subject in the shot scene.

Step S207: The control circuit 27 determines whether or not still image display (temporarily stop) is instructed from the operation member 23 during the reproduction of motion image. When still image display (temporarily stop) is instructed (YES side), the procedure moves to S208. On the other hand, when not instructed (NO side), the procedure moves to S212.

Step S208: The control circuit 27 temporarily stops motion image reproduction. Then, the control circuit 27 reproduces and displays, as a still image on the monitor 19, the specified image included in the composite images being reproduced when still image display is instructed in the state where no addition is performed via the data processing circuit 16 and the display control circuit 18.

That is, when still image display is instructed, the control circuit 27 displays the specified image as it is, which is a core of display, on the monitor 19 as a still image. This specified image has almost no image deletion compared to the composite image, and therefore, it is possible to reproduce a still image in the preferred state of fine appearance on the monitor 19.

Step S209: The control circuit 27 determines whether or not recording instruction of the still image during being reproduced and displayed is received from the operation member 23. When recording instruction is received (YES side), the procedure moves to S210. On the other hand, when not received (NO side), the procedure moves to S211.

Step S210: The control circuit 27 records identification data (marker) indicative of the specified image displayed as a still image in the image file. After that, the control circuit 27 moves the procedure to S211.

Step S211: The control circuit 27 determines whether or not an instruction to continue motion image reproduction is received from the operation member 23. When an instruction to continue motion image reproduction is received (YES side), the procedure moves to S212. On the other hand, when not received (NO side), the control circuit 27 ends the series of processing.

Step S212: The control circuit 27 determines whether or not the specified image in the last frame is reproduced. When the above-mentioned requirement is met (YES side), the control circuit 27 ends the series of processing as well as ending the reproduction of the image file. On the other hand, when the above-mentioned requirement is not met (NO side), the control circuit 27 returns the procedure to S206 and repeats the above-mentioned operations.

Step S213: The control circuit 27 continuously reproduces only the recording images of the decoded images in a frame by frame reproduction manner on the monitor 19 along time series via the data processing circuit 16 and the display control circuit 18 (dynamic reproduction). Consequently, the dynamic reproduction of the recording images obtained by continuous shooting is started. In this case, the control circuit 27 may also continuously reproduce the interpolation images and the recording images along time series.

Step S214: The control circuit 27 determines whether or not an instruction to display a still image is received from the operation member 23 during dynamic reproduction. When an instruction to display a still image is received (YES side), the procedure moves to S215. On the other hand, when not received (NO side), the procedure moves to S219.

Step S215: The control circuit 27 temporarily stops dynamic reproduction and displays the image being reproduced when still image display is instructed on the monitor 19 as a still image.

Step S216: The control circuit 27 determines whether or not a recording instruction to record the still image (S215) during being reproduced and displayed is received from the operation member 23. When the recording instruction is received (YES side), the procedure moves to S217. On the other hand, when not received (NO side), the procedure moves to S218.

Step S217: The control circuit 27 records identification data (marker) indicative of the image displayed as a still image in the image file. After that, the control circuit 27 moves the procedure to S218.

Step S218: The control circuit 27 determines whether or not an instruction to continue dynamic reproduction is received from the operation member 23. When an instruction to continue dynamic reproduction is received (YES side), the procedure moves to S219. On the other hand, when not received (NO side), the control circuit 27 ends a series of processing.

Step S219: The control circuit 27 determines whether or not the image in the final frame of the image file is reproduced. When the above-mentioned requirement is met (YES side), the control circuit 27 ends a series of processing as well as ending the reproduction of the image file. On the other hand, when the above-mentioned requirement is not met (NO side), the control circuit 27 returns the procedure to S213 and repeats the above-mentioned operations.

Step S220: The control circuit 27 displays the image in the image file on the monitor 19 as a still image via the data processing circuit 16 and the display control circuit 18. When the identification data (generated in S210, S217) is included in the image file, the control circuit 27 can extract the image corresponding to the identification data and quickly reproduce and display the image on the monitor 19. The explanation of the flowchart in FIG. 6 is completed as above.

Hereinafter, the working and effect of the first embodiment are described. The electronic camera in the first embodiment, in order to generate a composite image, records the addition rate of the image to be added in association with the specified image. Then, the electronic camera adds the interpolation images before and after the specified image in the time base direction based on the addition rate and generates a composition image having the image deletion to perform motion image reproduction. As a result, in the first embodiment, when reproducing the recording images obtained by continuous shooting as a motion image, it is possible to reproduce a motion image in which the flow of motions is smooth and preferred on the monitor 19.

Further, the electronic camera in the first embodiment displays the specified image, which is a core of display, on the monitor 19 as a still image when an instruction to reproduce a still image is issued during reproduction of a motion image. As a result, in the first embodiment, it is possible to reproduce a still image in the preferred state where there is no image deletion on the monitor 19 when displaying one frame as a still image during reproduction of a motion image.

Further, with the electronic camera in the first embodiment, it is possible to reduce the recording capacity compared to when both the motion image file including the composite images and the data of a plurality of specified images are recorded.

<Explanation of Second Embodiment>

Hereinafter, the operation in a continuous shooting mode and the operation in a reproduction mode of an electronic camera in a second embodiment are explained, respectively. Here, the second embodiment is a modified example of the first embodiment. The configuration of the electronic camera in the second embodiment is common to that of the electronic camera in the first embodiment shown in FIG. 1, and therefore, its duplicated explanation is omitted.

(Explanation of Continuous Shooting Mode)

Figure 9:
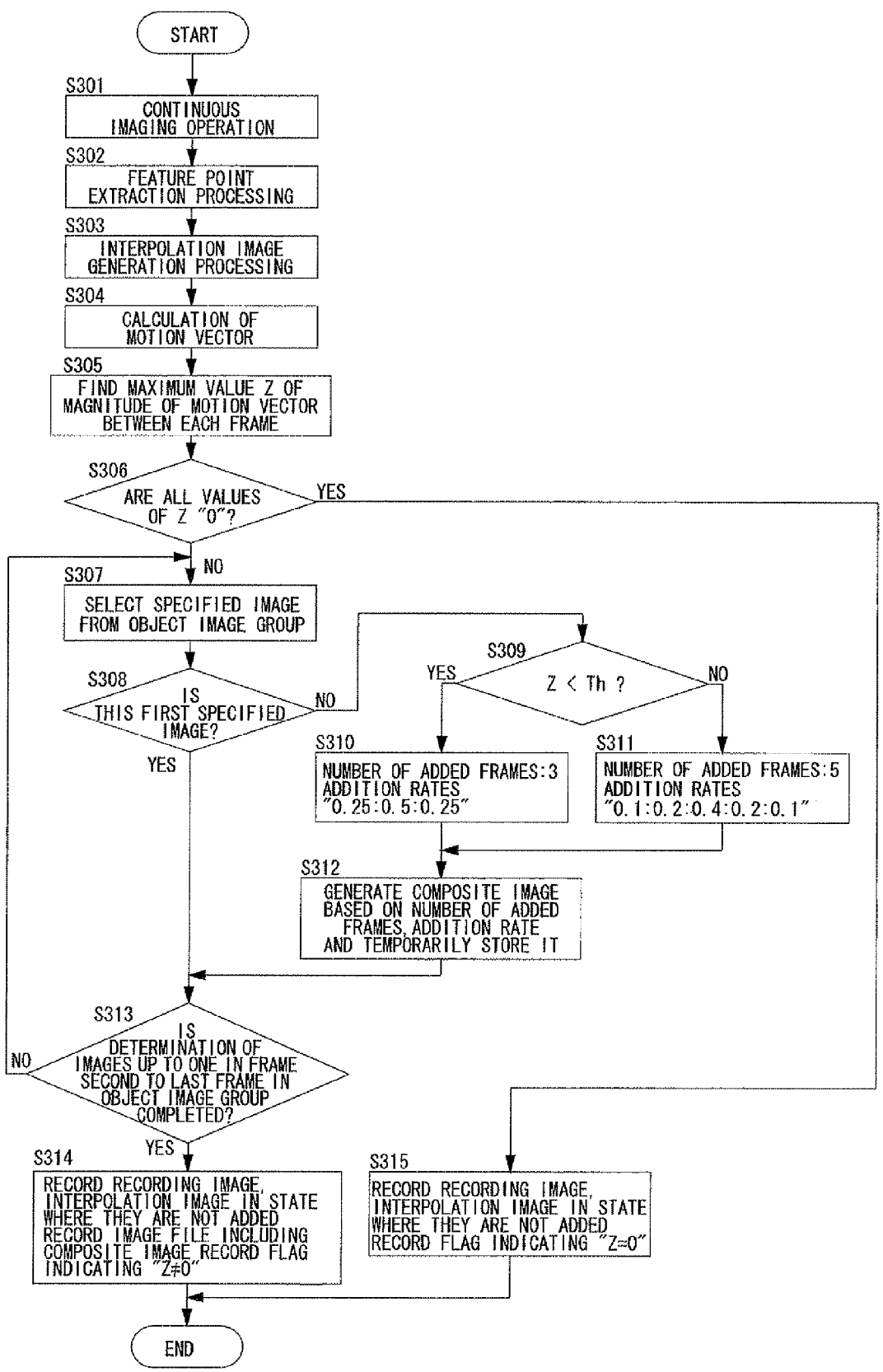
FIG. 9 is a flowchart showing operations in a continuous shooting mode in a second embodiment.

FIG. 9 is a flowchart showing the operation in the continuous shooting mode in the second embodiment. S301 to S311 in FIG. 9 correspond to S101 to S111 in FIG. 2, respectively. S315 in FIG. 9 corresponds to S115 in FIG. 2. Accordingly, duplicated explanation of each step is omitted.

Step S312: The control circuit 27 generates a composite image by adding the data of specified image and the interpolation image based on the above-mentioned number of added frames and the addition rate (obtained in S110 or S111). Then, the control circuit 27 temporarily stores the data of the generated composite image in the first memory 17.

Step S313: The control circuit 27 determines whether or not determination of the frames up to the frame second to the last frame in the object image group including the frame of the recording image and the frame of the interpolation image is completed. In the present embodiment, whether or not determination of the frames up to the frame second to the last frame of the recording image is completed is determined. When the above-mentioned requirement is met (YES side), the procedure moves to S314. On the other hand, when the above-mentioned requirement is not met (NO side), the control circuit 27 returns the procedure to S307 and repeats the above-mentioned operations.

Step S314: The compression/decompression circuit 20 generates a first image file by performing the Motion-JPEG compression in a state where the data of the recording image and the data of the interpolation image are not added (in a state where no composite image is generated) in response to an instruction of the control circuit 27.

Further, the compression/decompression circuit 20 generates a second image file by performing the MPEG compression using the specified image in the first frame, the above-mentioned composite image, and the specified image in the final frame as a single motion image in response to the instruction of the control circuit 27.

The control circuit 27 records a flag to the effect that the magnitude of the motion vector is not "0" in the first image file and the second image file, respectively. Then, the first image file and the second image file are finally stored in the memory medium 29. After that, the control circuit 27 ends the processing of the continuous shooting mode. The explanation of the flowchart in FIG. 9 is completed as above.

(Explanation of Reproduction Mode)

Figure 7:
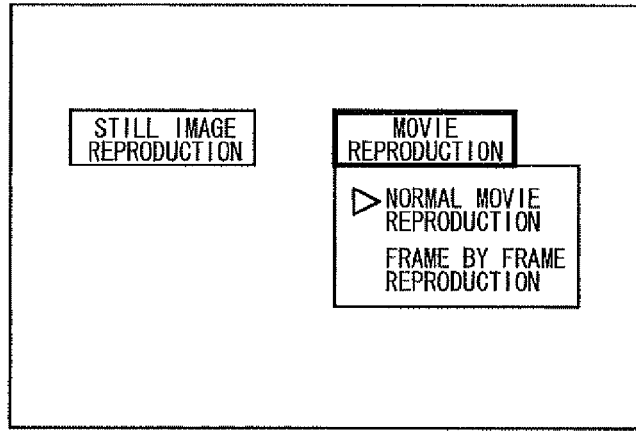
FIG. 7 is a diagram showing an example of a reproduction mode selection screen of an image file.
Figure 10:
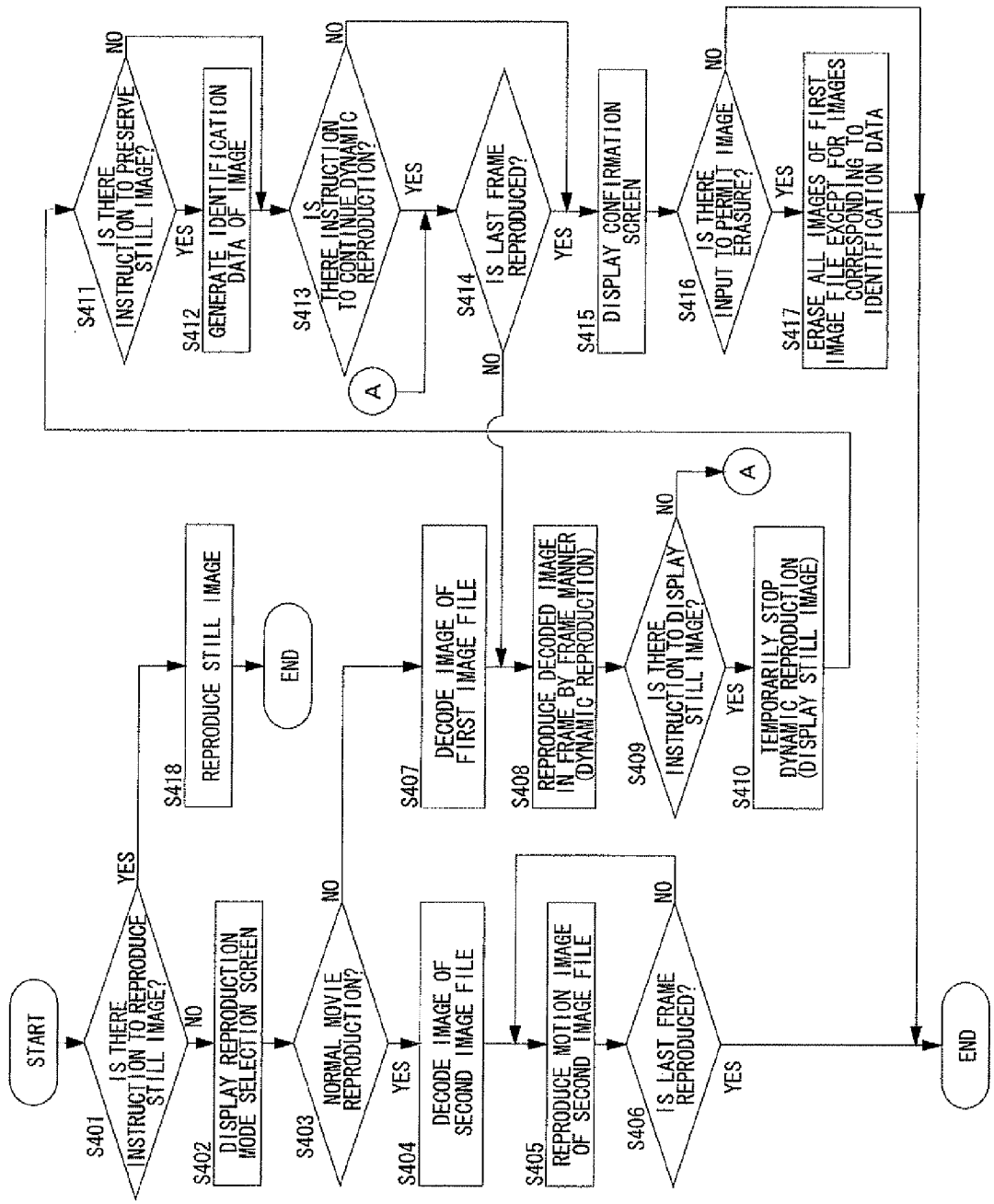
FIG. 10 is a flowchart showing operations in a reproduction mode in the second embodiment.

FIG. 10 is a flowchart showing the operation in the reproduction mode in the second embodiment. The reproduction mode is explained on the assumption that the image file generated in the above-mentioned S314 is the object for reproduction among those in the above-mentioned continuous shooting mode. The processing of the flowchart is started when a user issues an image reproduction instruction by operating the operation member 23. That is, the processing of the flowchart is started when "still image reproduction" or "motion image reproduction" shown in FIG. 7 is instructed.

Step S401: The control circuit 27 determines whether or not still image reproduction of an image file is instructed. When still image reproduction is instructed (YES side), the procedure moves to S418. On the other hand, when not instructed (NO side), the procedure moves to S402.

Step S402: The control circuit 27 displays a screen (refer to FIG. 7) on the monitor 19, which prompts a user to select a reproduction mode of the image file between "normal movie reproduction" and "frame by frame reproduction (dynamic reproduction)". Then, the control circuit 27 waits for an input to select a reproduction mode from a user via the operation member 23. Upon receipt of the above-mentioned input to select a reproduction mode from the operation member 23, the control circuit 27 moves the procedure to S403.

Step S403: The control circuit 27 determines whether or not the input to select the reproduction mode of "normal movie reproduction" is made. When "normal movie reproduction" is selected (YES side), the procedure moves to S404. On the other hand, when "frame by frame reproduction" is selected (NO side), the procedure moves to S407.

Step S404: The control circuit 27 reads the second image file of the image files to be reproduced from the memory medium 29. Then, the compression/decompression circuit 20 performs the decoding processing of the image data in the second image file in response to an instruction of the control circuit 27. The data of each decoded image is stored temporarily in the first memory 17.

Step S405: The control circuit 27 reproduces the image data (the specified image in the first frame, the composite image, the specified image in the last frame) buffered in the first memory 17 as a motion image along time series on the monitor 19 via the data processing circuit 16 and the display control circuit 18.

Step S406: The control circuit 27 determines whether or not the specified image in the final frame is reproduced. When the above-mentioned requirement is met (YES side), the control circuit 27 ends the series of processing as well as ending reproduction of the image file. On the other hand, when the above-mentioned requirement is not met (NO side), the control circuit 27 returns the procedure to S405 and repeats the above-mentioned operations.

Step S407: The control circuit 27 reads the first image file of the image files to be reproduced from the memory medium 29. Then, the compression/decompression circuit 20 performs decoding processing on the image data in the first image file in response to an instruction of the control circuit 27. The data of each decoded image is stored temporarily in the first memory 17.

Step S408: The control circuit 27 continuously reproduces only the recording images of the image data buffered in the first memory 17 on the monitor 19 in a frame by frame reproduction manner (dynamic reproduction) along time series via the data processing circuit 16 and the display control circuit 18. In this case, the control circuit 27 may also continuously reproduce the interpolation images and the recording images along time series.

Step S409: The control circuit 27 determines whether or not an instruction to display a still image is received from the operation member 23 during dynamic reproduction. When an instruction to display a still image is received (YES side), the procedure moves to S410. On the other hand, when not received (NO side), the procedure moves to step S414.

Step S410: The control circuit 27 temporarily stops dynamic reproduction and displays the image being reproduced when still image display is instructed on the monitor 19 as a still image.

Step S411: The control circuit 27 determines whether or not a preserve instruction of the still image (S411) during being reproduced and displayed is received from the operation member 23. When preservation instruction is received (YES side), the procedure moves to S412. On the other hand, when not received (NO side), the procedure moves to S413.

Step S412: The control circuit 27 records identification data (marker) indicative of the image displayed as a still image in the first image file.

Step S413: The control circuit 27 determines whether or not an instruction to continue dynamic reproduction is received from the operation member 23. When an instruction to continue dynamic reproduction is received (YES side), the procedure moves to S414. On the other hand, when not received (NO side), the procedure moves to S415.

Step S414: The control circuit 27 determines whether or not the image in the final frame of the first image file is reproduced. When the above-mentioned requirement is met (YES side), the control circuit 27 moves the procedure to S415 as well as ending the reproduction of the image file. On the other hand, when the above-mentioned requirement is not met (NO side), the control circuit 27 returns the procedure to S408 and repeats the above-mentioned operations.

Step S415: The control circuit 27 displays a confirmation screen (not shown schematically) on the monitor 19, which prompts a user to confirm the erasure of images not associated with the identification data (images other than those displayed as still images) of the image data of the first image file when the first image file includes the identification data (generated in S412). Then, the control circuit 27 waits for an input from the user via the operation member 23.

Step S416: The control circuit 27 determines whether or not an input to permit image erasure is received from the operation member 23. When image erasure permission is input (YES side), the procedure moves to S417. On the other hand, when image erasure cancellation is input (NO side), the control circuit 27 ends the series of the processing. In this case, the first image file is preserved as it is.

Step S417: The control circuit 27 erases as a whole all the image data (data of the recording images and the interpolation images) other than those associated with the identification data of the image data of the first image file. Consequently, it is possible to reduce the data size of the first image file while reserving the still images selected by the user. After that, the control circuit 27 ends the series of the processing.

Step S418: The control circuit 27 displays an image in the image file on the monitor 19 as a still image via the data processing circuit 16 and the display control circuit 18. The explanation of the flowchart in FIG. 10 is completed as above.

The electronic camera in the second embodiment records the motion image data of the composite image generated by adding the image to be added to the specified image (second image file) and the data of each specified image (first image file). As a result, the electronic camera in the second embodiment can easily reproduce the specified image suitable for still image display and the composite image suitable for motion image display.

(Supplementary Items of Embodiments)

(1) In the electronic camera in the above-mentioned embodiments, it may also be possible to locate a phase difference AF module in a shooting light path and to perform a phase difference AF operation by the publicly known pupil division in addition to the contrast AF operation. Further, in the above-mentioned embodiments, the example is explained, in which the AE calculation is performed based on the output of the image pickup device 13, however, it may also be possible to provide a photometric element for AE calculation separately from the image pickup device 13.

(2) In the above-mentioned embodiments, the example is explained, in which the interpolation image and the composite image are generated from the data of the recording image. However, in the above-mentioned embodiments, for example, when the data of the recording image and the data of the view image set to the display size of the monitor 19 or less are grouped and recorded in the memory medium 29, the control circuit 27 may generate the interpolation image and the composite image from the data of the view image by preferentially selecting the data of the above-mentioned view image.

(3) In the above-mentioned embodiments, the motion vector is obtained between two recording images, however, it may also be possible to obtain a motion vector between a recording image and an interpolation image.

(4) In the above-mentioned embodiments, the example is explained, in which the specified image is selected from the recording images continuously shot, however, it may also be possible to select the specified image from the frame of the interpolation image and generate a composite image by adding images before and after the interpolation image in the time base direction as images to be added.

(5) The compression method of an image file in the first embodiment is not limited to the Motion-JPEG compression and another compression method, such as a codec of movie lossless compression and a method in which compression in the time base direction is not performed (Motion-JPEG 2000 etc.) may be accepted. Alternatively, in the first embodiment, it may also be possible to generate an image file by compression processing in conformance with the MPEG standards.

Further, also in the second embodiment, it may be possible to compress the first image file in conformance with the MPEG standards or to record the second image file in a compression method, such as Motion-JPEG.

(6) In the reproduction mode in the above-mentioned second embodiment, the control circuit 27 may generate identification data indicative of the specified image corresponding to the composite image at the time of reproduction stop when receiving the instruction to stop the reproduction of the motion image from the operation section during the reproduction of the second image file. Then, the control circuit 27 may erase the data of all the images (data of the recording images and the interpolation images) other than those corresponding to the identification data of the first image file as above-mentioned S415 to S417.

(7) In the above-mentioned embodiments, the example is explained, in which the control circuit 27 of the electronic camera generates the composite image etc., however, for example, the external device 30 (personal computer etc.) coupled with the electronic camera may perform the processing of the control circuit 27 in the above-mentioned embodiments. Further, it may also be possible to realize the algorithm explained in the above-mentioned first embodiment or the second embodiment by causing the external device 30 to share part of the processing to be performed by the control circuit 27 of the electronic camera in the above-mentioned embodiments so that the electronic camera and the external device 30 cooperate.

(8) In the above-mentioned embodiments, the example is explained, in which the composite image is generated by selecting images to be added from the images before and after the specified image with respect to time. However, in the above-mentioned embodiments, it may also be possible to select an image to be added only from the image before the specified image with respect to time (or only from the image after the specified image with respect to time).

(9) In S112 in the above-mentioned embodiments, the configuration is explained, in which the data of the number of added frames and the addition rate are associated only with the data of the specified image and recorded. However, in the above-mentioned embodiments, it may also be possible to associate the data of each image in the object image group with the data indicative of the specified when an image is composited and the data of the addition rate at the time of image composition, respectively, and record the data.

Figure 5B:
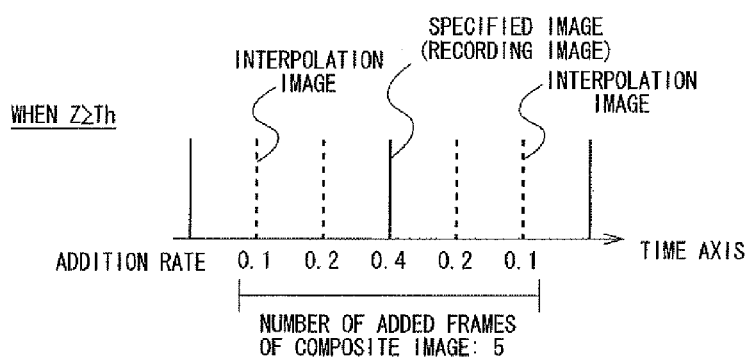

Hereinafter, the above-mentioned example is explained specifically by referring to FIG. 5B. In this example, the number of added frames is set to "5" and the addition rates expressed in the time base direction are assumed to be "0.1: 0.2:0.4:0.2:0.1". For example, when the central recording image in the object image group shown in FIG. 5B is the specified image, the data indicative of the "central recording image" as the specified image and the addition rate "0.1" at that time are associated with the data of the second image (interpolation image) from the right and recorded. Similarly, when the rightmost recording image is the specified image, the data indicative of the "right recording image" as the specified image and the addition rate "0.2" at that time are associated with the data of the second image (interpolation image) from the right and recorded.

(10) In the processing in S101, S301 in the above-mentioned embodiments, the example is explained, in which the data of the recording image is recorded in the first memory 17, however, it may also be possible to record the data of the recording image in the memory medium 29 in the above-mentioned case. In this case, the processing after S102, S302 is performed based on the data of the recording image stored in the memory medium 29 as a result.

(11) In the continuous shooting mode in the above-mentioned embodiments, when the specified image is selected from both the recording image and the interpolation image, or when the specified image is selected from part of the recording image, the control circuit 27 finds a maximum value Z' of the motion vector from the current specified image and the next specified image. Then, it is assumed that the control circuit 27 in this case performs the determination of Z'<Th in S109, S309.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A non-transitory computer readable program recording medium storing, for a computer having a data reading section which reads data of an image and having a calculating section, a program to cause the calculating section to execute:
   a first step reading, into the calculating section, data of a plurality of still images generated by continuously imaging still images of a subject using an imaging apparatus;
   a second step generating an interpolation image by interpolating change in position of the subject between two images of the plurality of still images;
   a third step determining a specified image from among an object image group which includes the plurality of still images and the interpolation image, respective images in the object image group being continued in a time base direction;
   a fourth step determining a first image to be added from images among the object image group before the specified image in the time base direction and with different positions of the subject in order to generate a composite image by adding the first image to be added before the specified image in the time base direction to the specified image and determining an addition rate of the first image to be added to the specified image; and
   a fifth step recording data of the first image to be added and the addition rate in correspondence with data of the respective images in the object image group in association with the data of the respective images.

2. The non-transitory computer readable program recoding medium according to claim 1, storing a program to cause the calculating section to further execute:
   a sixth step selecting a second image to be added from an image after the specified image among the object image group in order to generate a composite image by adding the image after the specified image in the time base direction to the specified image and determining an addition rate of the second image to be added to the specified image; and
   a seventh step recording data of the addition rate of the second image to be added in association with data of the specified image.

3. The non-transitory computer readable program recording medium according to claim 1, storing a program to cause the calculating section in at least one of the steps to perform functions of:

obtaining a motion vector of the subject between a standard image and the specified image by using the standard image which is different in the time base direction with respect to the specified image among the object image group; and varying an addition rate of an image to be added to the specified image in accordance with a magnitude of the motion vector.

4. The non-transitory computer readable program recording medium according to claim 1, storing a program wherein:
the computer further has a monitor; and
an image size of the specified image is set to be a display size or less of the monitor.

5. An image processing apparatus comprising the computer executing the program stored in the non-transitory program recording medium according to claim 1.

6. An imaging apparatus comprising:
an imaging section imaging a subject to generate data of an imaged image; and
the image processing apparatus according to claim 5.

7. The non-transitory computer readable program recoding medium according to claim 1, wherein the specified image is selected from among the plurality of still images.

8. A non-transitory computer readable program recording medium storing, for a computer having a data reading section which reads data of an image, a calculating section, and an operating section, a program comprising:
a first step reading, into the calculating section, data of an object image group which includes a plurality of specified images and interpolation images having each been generated by interpolating images of the object image group, respective images in the object image group being still images continued in a time base direction, and reading addition rate data recorded in correspondence with each of the specified images and indicative of an addition rate of images to be added to each of the specified images, in case of generating composite images by adding at least one or more images to be added to the specified images, the images to be added being different in the time base direction;
a second step generating a plurality of the composite images using data indicative of a specified image at a time of compositing the image and addition rate data at the time of compositing the image;
a third step reproducing and outputting the plurality of the composite images along time series; and
a fourth step displaying and outputting, as a still image, the specified image, which is an image used for generating the composite images being reproduced, when receiving an instruction to temporarily stop from the operating section during the reproduction and output in the third step.

9. The non-transitory computer readable program recording medium according to claim 8, storing a program wherein:
the computer further has an operation section;
a first reproduction mode which executes the second step and the third step, and a second reproduction mode are provided; and
in the second reproduction mode, the calculating section reproduces and outputs the specified images along time series and displays and outputs, as a still image, a specified image being reproduced when receiving an instruction to temporarily stop from the operation section during the reproduction and output.

10. The non-transitory computer readable program recording medium according to claim 8, storing a program to cause the calculating section to further execute a fifth step generating identification data indicative of the specified image displayed and output as the still image.

11. The non-transitory computer readable program recording medium according to claim 8, storing a program wherein:
the computer further has a monitor, and data of each of the specified images in the object image group is made up by grouping data of a plurality of images having the same composition but image sizes being different; and
the calculating section generates the composite images preferentially using images with the image sizes equal to or less than a display size of the monitor from among the data of the specified images in the second step.

12. An image processing apparatus comprising the computer executing the program stored in the non-transitory program recording medium according to claim 8.

13. An imaging apparatus comprising:
an imaging section imaging a subject to generate data of an imaged image; and
the image processing apparatus according to claim 12.

14. A non-transitory computer readable program recording medium storing, for a computer having a data reading section which reads data of an image, a calculating section, and an operation section, a program to cause the calculating section to execute:
a first step reading, into the calculating section, respective data of a plurality of specified images being still images continued in a time base direction, and data of a motion image including a plurality of composite images generated by adding an image to the specified images based on addition rate data recorded in correspondence with the specified images and indicative of an addition rate of the image to the specified images, the image being different in the time base direction;
a second step selectively executing a first reproduction mode which reproduces and outputs the specified images along time series and a second reproduction mode which reproduces and outputs the motion image in response to an input from the operation section;
a third step generating first identification data indicative of a specified image being reproduced when receiving a time series reproduction stop instruction to stop reproduction of the specified images along the time series from the operation section in a state where the first reproduction mode is selected in the second step;
a fourth step generating second identification data indicative of the specified image in correspondence with a composite image being displayed when receiving an instruction to stop reproduction of the motion image from the operation section in a state where the second reproduction mode is selected in the second step; and
a fifth step erasing data of all the specified images except the specified images corresponding to one of the first identification data and the second identification data.

15. An image processing method using one or more computers, comprising:
a first step reading, into the one or more computers, data of a plurality of still images generated by continuously imaging still images of a subject using an imaging apparatus;
a second step, by the one or more computers, generating an interpolation image by interpolating change in position of the subject between two images of the plurality of still images;
a third step, by the one or more computers, determining a specified image from among an object image group which includes the plurality of still images and the interpolation image, respective images in the object image group being continued in a time base direction;

a fourth step, by the one or more computers, determining a first image to be added from images among the object image group before the specified image and with different positions of the subject in order to generate a composite image by adding the first image to be added before the specified image in a time base direction to the specified image, and, by the one or more computers, determining an addition rate of the first image to be added to the specified image; and a fifth step, in the one or more computers, recording data of the first image to be added and the addition rate in correspondence with data of the respective images in the object image group in association with the data of the respective images.

16. The image processing method according to claim 15, wherein the specified image is selected from among the plurality of still images.

17. An image processing method using one or more computers, comprising:

a first step reading, into the one or more computers, data of an object image group which includes a plurality of specified images and interpolation images having each been generated by interpolating images of the object image group, respective images in the object image group being still images continued in a time base direction, and reading addition rate data recorded in correspondence with each of the specified images and indicative of an addition rate of images to be added to each of the specified images when generating composite images by adding at least one or more images to be added to the specified images, the images to be added being different in the time base direction;

a second step, by the one or more computers, generating a plurality of the composite images using data indicative of a specified image at a time of compositing the image and addition rate data at the time of compositing the image;

a third step, by the one or more computers, reproducing and outputting the plurality of the composite images along time series; and a fourth step, by the one or more computers, displaying and outputting as a still image, the specified image, which is an image used for generating the composite images being reproduced, when receiving an instruction to temporarily stop during the reproduction and output in the third step.

\* \* \* \* \*